United States Patent
Tanaka et al.

(10) Patent No.: US 10,173,594 B2
(45) Date of Patent: Jan. 8, 2019

(54) STEP OF INDUSTRIAL VEHICLE AND INDUSTRIAL VEHICLE

(71) Applicant: KCM Corporation, Kako-gun, Hyogo (JP)

(72) Inventors: Yuichiro Tanaka, Kakogawa (JP); Takatomo Ohno, Akashi (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 15/574,880

(22) PCT Filed: May 22, 2015

(86) PCT No.: PCT/JP2015/002595
§ 371 (c)(1),
(2) Date: Nov. 17, 2017

(87) PCT Pub. No.: WO2016/189564
PCT Pub. Date: Dec. 1, 2016

(65) Prior Publication Data
US 2018/0126912 A1    May 10, 2018

(51) Int. Cl.
*B60R 3/02* (2006.01)
*B60R 3/00* (2006.01)
(Continued)

(52) U.S. Cl.
CPC .............. *B60R 3/02* (2013.01); *B60R 3/00* (2013.01); *E02F 9/00* (2013.01); *E02F 9/0833* (2013.01); *E02F 9/16* (2013.01)

(58) Field of Classification Search
CPC .. B60R 3/00; B60R 3/02; B60R 3/005; B60R 3/07; E02F 9/08
See application file for complete search history.

(56) References Cited

U.S. PATENT DOCUMENTS 4,564,205 A * 1/1986 Shookman ................ B60R 3/00
                                                        182/196
9,688,204 B2 * 6/2017 Tsutsumi .................. B60R 3/02
(Continued)

FOREIGN PATENT DOCUMENTS

JP         4-1048 U      1/1992
JP         7-30013 U     6/1995
(Continued)

OTHER PUBLICATIONS

International Search Report (PCT/ISA/210) issued in PCT Application No. PCT/JP2015/002595 dated Jul. 7, 2015 with English translation (Four (4) pages).
(Continued)

*Primary Examiner* — James A Shriver, II
*Assistant Examiner* — James J Triggs
(74) *Attorney, Agent, or Firm* — Crowell & Moring LLP

(57) ABSTRACT

A step of an industrial vehicle according to the present invention includes: an upper footboard fixed to a side surface of the industrial vehicle; a turning mechanism provided at a rear side of the upper footboard; a front suspension member extending downward from a front portion of the upper footboard and having elasticity; a rear suspension member extending downward from the turning mechanism and having elasticity; and a lower footboard held by the front suspension member and the rear suspension member, wherein: an upper portion of the front suspension member is fixed to the front portion of the upper footboard so as to be non-turnable; a lower portion of the front suspension member is fixed to a front portion of the lower footboard so as to be non-turnable; a lower portion of the rear suspension member is fixed to a rear portion of the lower footboard so as to be non-turnable; and an upper portion of the rear suspension member is coupled to a rear portion of the upper (Continued)

footboard through the turning mechanism so as to be turnable around an axis extending in a vehicle width direction.

4 Claims, 6 Drawing Sheets

(51) Int. Cl.
　　　*E02F 9/00* (2006.01)
　　　*E02F 9/16* (2006.01)
　　　*E02F 9/08* (2006.01)

(56) References Cited

U.S. PATENT DOCUMENTS

| 2009/0294213 | A1 | 12/2009 | Kim et al. | |
| 2016/0339843 | A1* | 11/2016 | Rinaldi | B60R 3/02 |
| 2018/0044884 | A1* | 2/2018 | Tsutsumi | E02F 9/0833 |

FOREIGN PATENT DOCUMENTS

| JP | 2000-85475 | A | 3/2000 |
| JP | 2009-149245 | A | 7/2009 |
| JP | 2009-287384 | A | 12/2009 |
| JP | 2013-2209 | A | 1/2013 |

OTHER PUBLICATIONS

Japanese-language Written Opinion (PCT/ISA/237) issued in PCT Application No. PCT/JP2015/002595 dated Jul. 7, 2015 (Four (4) pages).

\* cited by examiner

STEP OF INDUSTRIAL VEHICLE AND INDUSTRIAL VEHICLE

TECHNICAL FIELD

The present invention relates to a step of an industrial vehicle and an industrial vehicle.

BACKGROUND ART

Among industrial vehicles such as hydraulic excavators and wheel loaders, an industrial vehicle having a relatively high height is provided with a step through which an operator goes to a driver's seat or an engine room. For example, the step is provided at a rear portion of the industrial vehicle. In this case, when the industrial vehicle climbs a slope, the step may contact a ground surface to be damaged.

The step of PTL 1 is configured such that a part of a footboard turns upward relative to the other part of the footboard. According to this configuration, when the step contacts the ground surface, a part of the footboard turns upward relative to the other part. With this, the damage of the step can be avoided.

CITATION LIST

Patent Literature

PTL 1: Japanese Laid-Open Patent Application Publication No. 2013-2209

SUMMARY OF INVENTION

Technical Problem

However, to configure a step such that a part of a footboard turns relative to the other part like the step of PTL 1, the footboard itself needs to be provided with a turning mechanism, and a turnable portion needs to secure strength as the footboard. Therefore, the footboard increases in size as a whole. As a result, a part of the footboard may be located at a vehicle width direction outer side of the locus of an outer wheel of the industrial vehicle although it depends on an installation position of the step. Further, when the industrial vehicle revolves, the step may contact left and right obstacles.

The present invention was made in view of these circumstances, and an object of the present invention is to provide a step capable of avoiding damage caused by contact with a ground surface and reducing its size in a vehicle width direction.

Solution to Problem

A step of an industrial vehicle according to one aspect of the present invention includes: an upper footboard fixed to a side surface of the industrial vehicle; a turning mechanism provided at a rear end of the upper footboard; a front suspension member extending downward from a front portion of the upper footboard and having elasticity; a rear suspension member extending downward from the turning mechanism and having elasticity; and a lower footboard held by the front suspension member and the rear suspension member, wherein: an upper portion of the front suspension member is fixed to the front portion of the upper footboard so as to be non-turnable; a lower portion of the front suspension member is fixed to a front portion of the lower footboard so as to be non-turnable; a lower portion of the rear suspension member is fixed to a rear portion of the lower footboard so as to be non-turnable; and an upper portion of the rear suspension member is coupled to a rear portion of the upper footboard through the turning mechanism so as to be turnable around an axis extending in a vehicle width direction.

Advantageous Effects of Invention

According to the above step of the industrial vehicle, even when the lower footboard contacts the ground surface, the front suspension member and the rear suspension member elastically deform, and the rear suspension member turns relative to the upper footboard, so that the damage of the step can be avoided. Further, since a turnable portion is limited, it is possible to prevent a case where the lower footboard is displaced relative to the upper footboard in a forward/rearward direction to become unstable. Furthermore, since the upper footboard is not required to have a complex structure, the upper footboard can be reduced in size in the vehicle width direction, and therefore, the step can be reduced in size in the vehicle width direction.

DESCRIPTION OF EMBODIMENTS

Hereinafter, an embodiment of the present invention will be explained in reference to the drawings. In the following explanations and the drawings, the same reference signs are used for the same or corresponding components, and a repetition of the same explanation is avoided.

Industrial Vehicle

Figure 1:
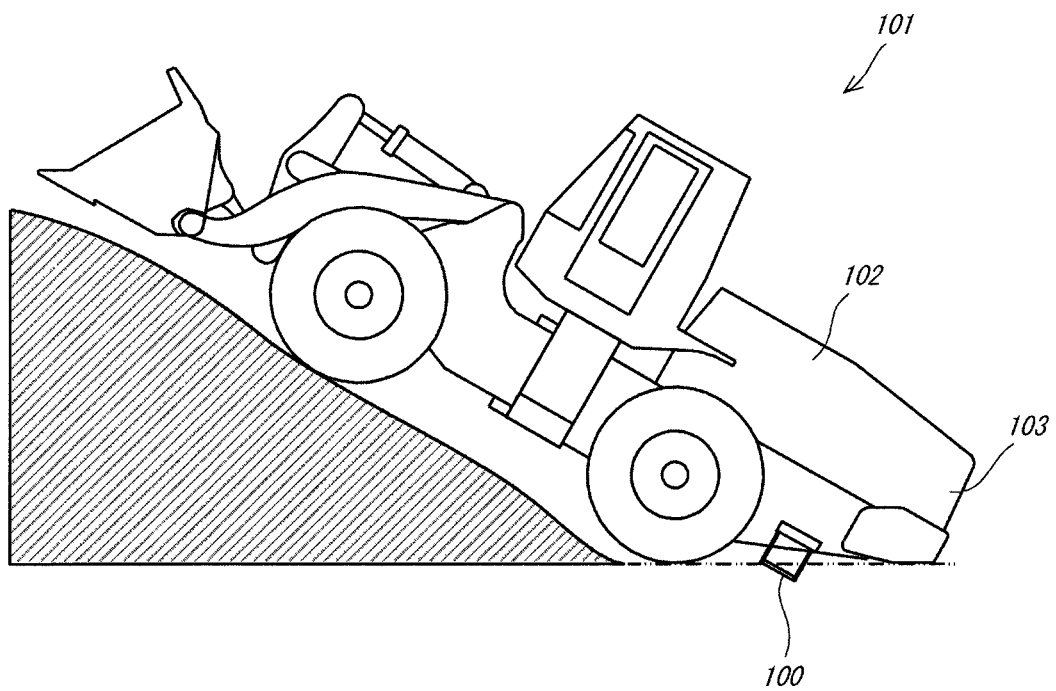
FIG. 1 is a side view of an industrial vehicle according to an embodiment.

First, an industrial vehicle 101 will be explained. FIG. 1 is a side view of the industrial vehicle 101 according to the present embodiment and shows that a front wheel runs onto a slope. It should be noted that directions mentioned in the following explanations are based on a viewpoint of a driver seated on a driver's seat of the industrial vehicle 101. To be specific, on a paper surface of FIG. 1, a left side corresponds to a front side of the industrial vehicle 101 and a forward direction, and a right side corresponds to a rear side of the industrial vehicle 101 and a backward direction. The industrial vehicle 101 shown in FIG. 1 is a wheel loader and includes a step 100 (rear step) at a left surface of a rear portion of a vehicle main body 102. The step 100 is a step through which an operator goes to an engine room 103 of the vehicle main body 102. It should be noted that the industrial vehicle 101 is not limited to the wheel loader and may be any other industrial vehicle such as a hydraulic excavator. Further, the step 100 may be provided at a right surface of the industrial vehicle 101 instead of the left surface of the industrial vehicle 101.

When the industrial vehicle 101 works or travels on a flat road, the step 100 never contacts a ground surface. However, as shown in FIG. 1, during scoop-up work or the like, a lower portion of the step 100 is located lower than a bottom surface of the vehicle main body 102 and contacts the ground surface in some cases. To be specific, as shown in FIG. 1, when the front wheel of the industrial vehicle 101 runs onto the slope, the industrial vehicle 101 inclines to contact the ground surface shown by a two-dot chain line in FIG. 1. At this time, especially a rear lower end portion of the step 100 contacts the ground surface to be pushed toward the ground surface while being dragged. Behaviors of the step 100 at this time will be described later.

Step

Figure 2:
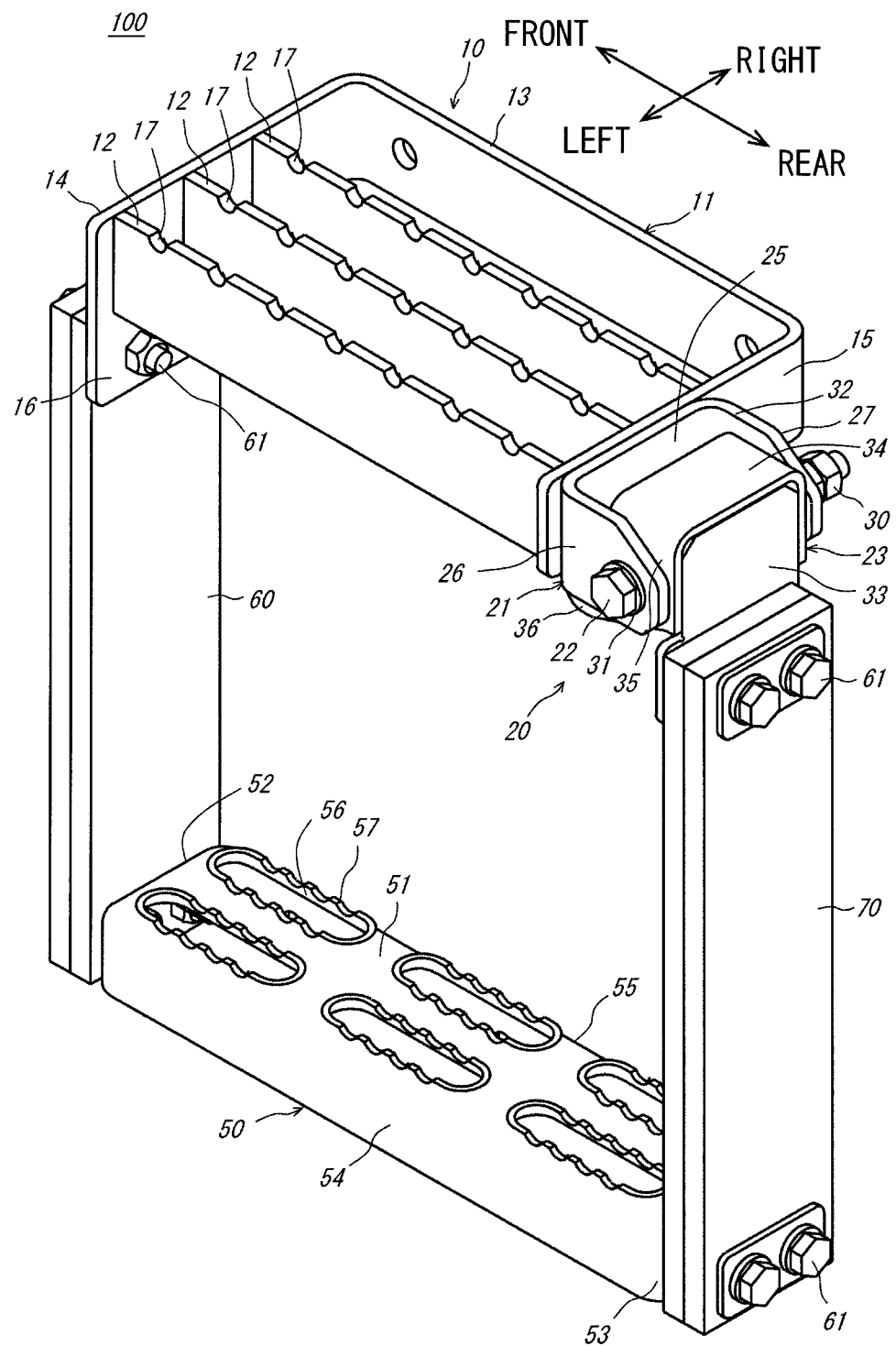
FIG. 2 is a perspective view of a step according to the embodiment.

Next, the configuration of the step 100 will be explained. FIG. 2 is a perspective view of the step 100 according to the present embodiment. On a paper surface of FIG. 2, an upper left side corresponds to a "front side," a lower right side corresponds to a "rear side," a right far side corresponds to a "right side," and a left near side corresponds to a "left side." Further, a leftward/rightward direction corresponds to a "vehicle width direction." As shown in FIG. 2, the step 100 according to the present embodiment is a suspension-type step constituted by two stages and includes an upper footboard 10, a turning mechanism 20, a lower footboard 50, a front suspension member 60, and a rear suspension member 70. Hereinafter, these components will be explained in order.

The upper footboard 10 is a footboard at an upper stage of the step 100. The upper footboard 10 is entirely made of metal and includes: a C-shaped outer edge member 11 forming an external shape of the upper footboard 10; and three reinforcing plate members 12 located inside the outer edge member 11. The outer edge member 11 includes: a side surface portion 13 extending in a forward/rearward direction and attached to the vehicle main body 102 (see FIG. 1) of the industrial vehicle 101; a front surface portion 14 extending leftward from a front end of the side surface portion 13; a rear surface portion 15 extending leftward from a rear end of the side surface portion 13; and a fixing portion 16 extending downward from the front surface portion 14. The reinforcing plate members 12 extend in the forward/rearward direction and are arranged at regular intervals in the leftward/rightward direction so as to be bridged between the front surface portion 14 and the rear surface portion 15. The reinforcing members 12 are arranged such that upper edges thereof are flush with an upper edge of the outer edge member 11. It should be noted that concave cutout portions 17 are formed on the upper edge of each of the reinforcing members 12 at regular intervals in the forward/rearward direction. The cutout portions 17 serve as slip stoppers when an operator goes up and down.

Figure 3:
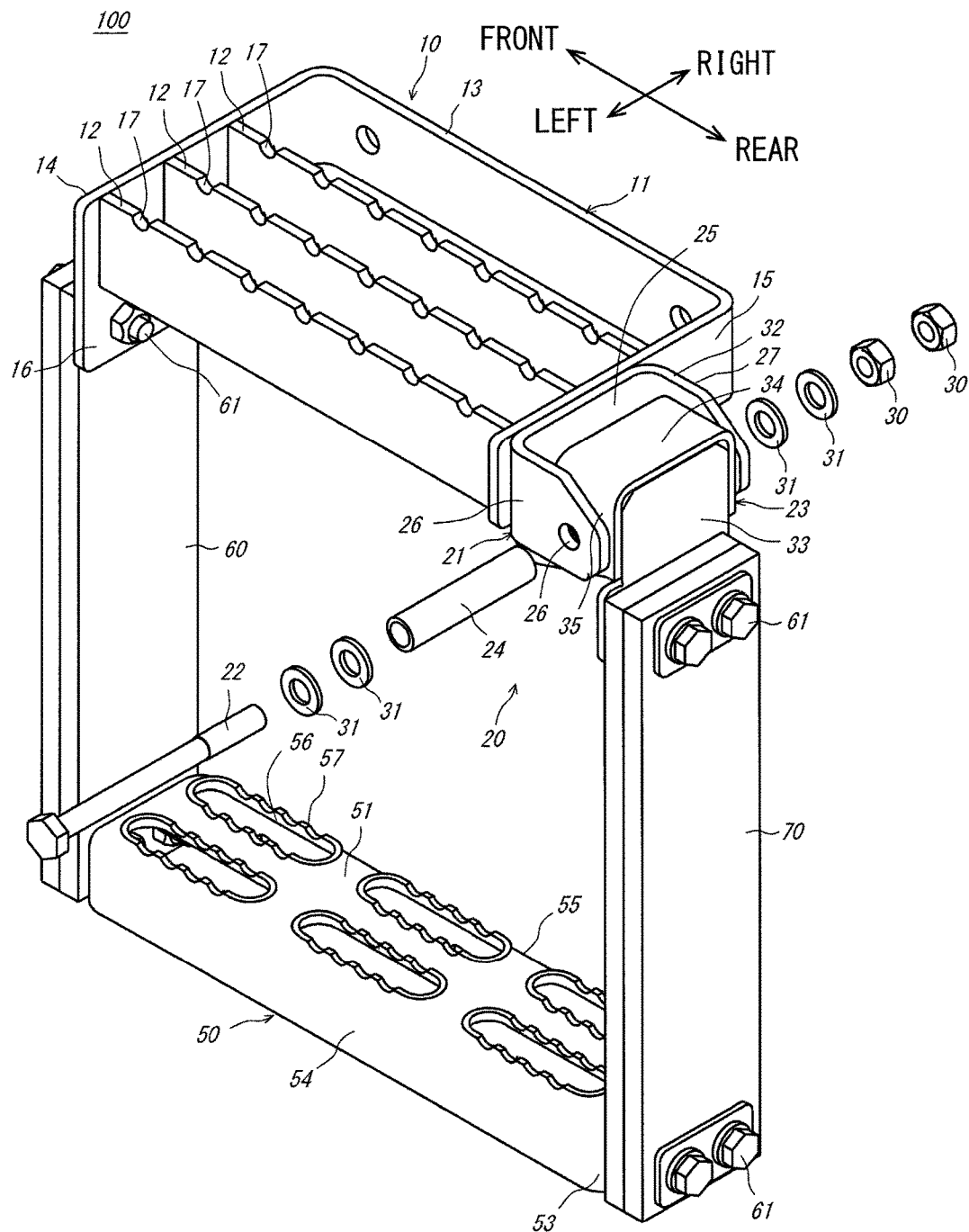
FIG. 3 is an exploded view of a turning mechanism shown in FIG. 2.
Figure 4:
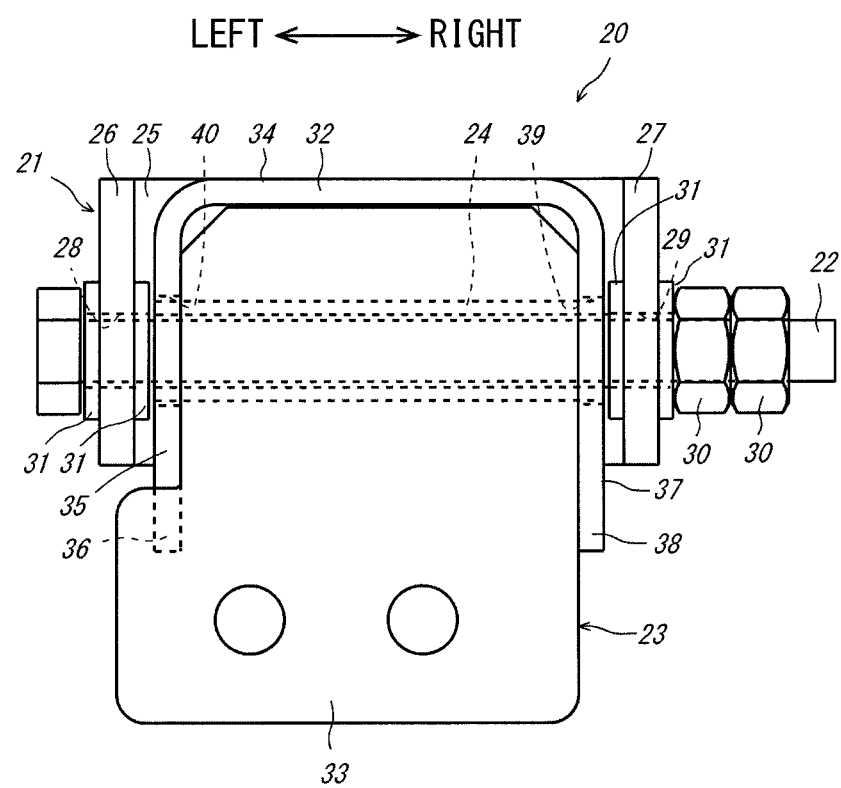
FIG. 4 is an enlarged view of the turning mechanism when viewed from behind.
Figure 5A:
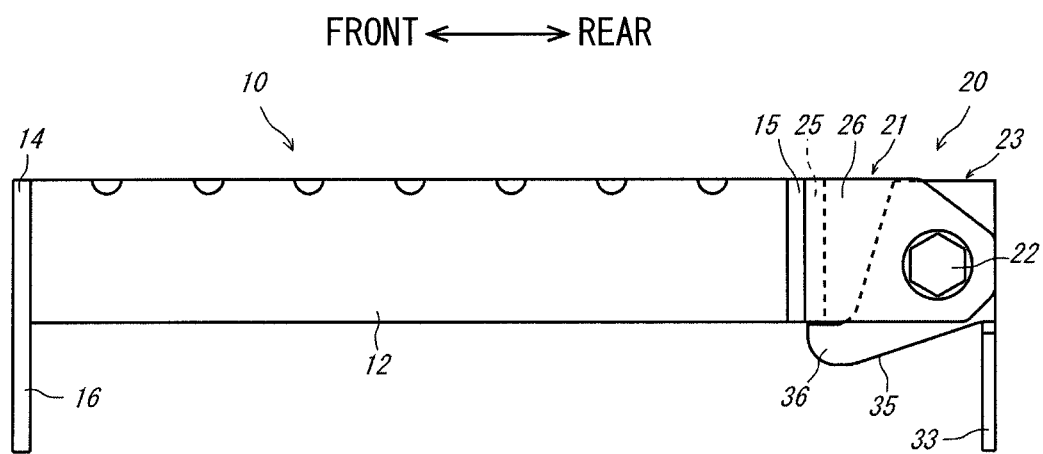
FIG. 5A shows the turning mechanism in a basic state.
Figure 5B:
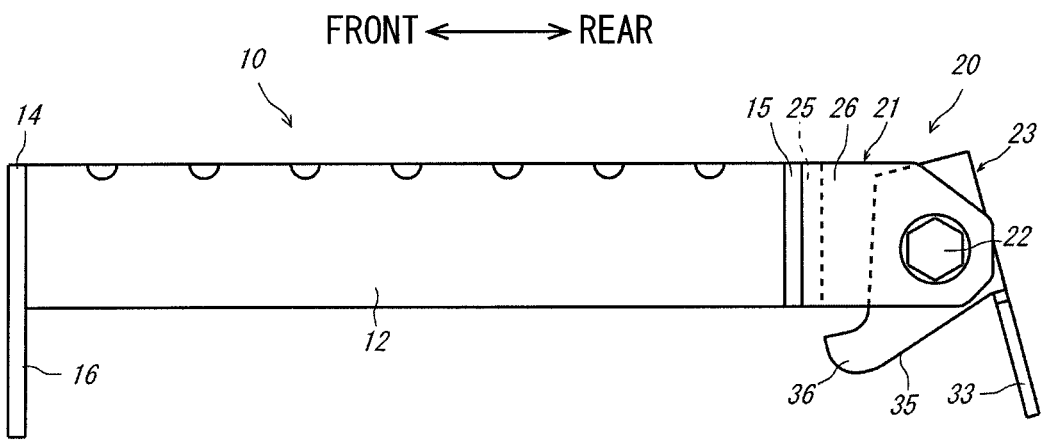
FIG. 5B shows the turning mechanism when the turning mechanism turns rearward.

The turning mechanism 20 is a mechanism configured to turn the rear suspension member 70 relative to the upper footboard 10. The turning mechanism 20 is a member formed separately from the upper footboard 10 and is smaller in size in the vehicle width direction than the upper footboard 10. The turning mechanism 20 is provided at a left side of a rear end of the upper footboard 10. FIG. 3 is an exploded view of the turning mechanism 20 shown in FIG. 2. FIG. 4 is an enlarged view of the turning mechanism 20 when viewed from behind. FIG. 5A shows the turning mechanism in a basic state. FIG. 5B shows the turning mechanism when the turning mechanism turns rearward. It should be noted that the above "basic state" denotes a state when the industrial vehicle 101 is in a horizontal state, and no external force is applied to the step 100. As shown in FIG. 3, the turning mechanism 20 includes: a shaft receiving member 21 fixed to the rear surface portion 15 of the upper footboard 10; a shaft member 22 received by the shaft receiving member 21; a turning member 23 supported by the shaft member 22 so as to be turnable; and a tubular protective member 24 covering the shaft member 22.

In a plan view, the shaft receiving member 21 has a C shape that is open rearward. The shaft receiving member 21 includes: a fixing portion 25 extending in the leftward/rightward direction and fixed to the rear surface portion 15 of the upper footboard 10; a left receiving portion 26 extending rearward from a left end of the fixing portion 25; and a right receiving portion 27 extending rearward from a right end of the fixing portion 25. The left receiving portion 26 and the right receiving portion 27 include receiving holes 28 and 29, respectively (see FIG. 4). The shaft member 22 is received by the receiving holes 28 and 29. To be specific, the shaft member 22 is received by the two receiving portions 26 and 27.

The shaft member 22 is a member supporting the turning member 23 such that the turning member 23 is turnable. In the present embodiment, adopted as the shaft member 22 is a bolt having a tip end portion on which threads are formed. As shown in FIG. 4, the shaft member 22 is inserted from the left side of the shaft receiving member 21 and penetrates the shaft receiving member 21, and the tip end portion of the shaft member 22 is located at the right side of the shaft receiving member 21. Two nuts 30 are attached to a tip end of the shaft member 22. The shaft member 22 is not fixed to the shaft receiving member 21 and is rotatable relative to the shaft receiving member 21. It should be noted that washers 31 are inserted between a head of the shaft member 22 and the left receiving portion 26, between the left receiving portion 26 and the turning member 23, between the turning member 23 and the right receiving portion 27, and between the right receiving portion 27 and the nut 30.

The turning member 23 is a member configured to rotate relative to the shaft receiving member 21 around an axis extending in the vehicle width direction. The turning member 23 includes a bent plate member 32 and a flat plate member 33. In a sectional view perpendicular to the forward/rearward direction, the bent plate member 32 has a C shape that is open downward. The bent plate member 32 includes: an upper surface portion 34 extending in a horizontal direction; a left surface portion 35 extending downward from a left end of the upper surface portion 34; a left stopper portion 36 extending in a front lower direction from the left surface portion 35; a right surface portion 37 extending downward from a right end of the upper surface portion 34; and a right stopper portion 38 extending in the front lower direction from the right surface portion 37. The left surface portion 35 and the right surface portion 37 include through holes 39 and 40, respectively, and the shaft member 22 penetrates the through holes 39 and 40. The flat plate member 33 is a plate-shaped member, and an upper portion of the flat plate member 33 is fixed to a rear end portion of an inner peripheral surface of the bent plate member 32. A lower portion of the flat plate member 33 is larger in size in the leftward/rightward direction than the upper portion of the flat plate member 33. As shown in FIG.

5A, the flat plate member 33 extends in the vertical direction in the basic state. At this time, the left stopper portion 36 and the right stopper portion 38 are in contact with a lower end of the fixing portion 25 of the shaft receiving member 21.

The protective member 24 is a member configured to protect the shaft member 22. As shown in FIG. 4, the protective member 24 is located between the left receiving portion 26 and the right receiving portion 27 and covers the shaft member 22 with a predetermined gap in a radial direction. Left and right end portions of the protective member 24 are respectively inserted into the through holes 39 and 40 of the left and right surface portions 35 and 37 of the turning member 23. The protective member 24 is configured as above. Therefore, for example, even when a stone flies toward the shaft member 22 during work, the stone hits the protective member and does not hit the shaft member 22. On this account, the shaft member 22 does not deform, and the turning of the turning member 23 around the shaft member 22 is not hindered.

The lower footboard 50 is a footboard at a lower stage of the step 100. The lower footboard 50 is held by the front suspension member 60 and the rear suspension member 70 and is located under the upper footboard 10. Unlike the upper footboard 10, the lower footboard 50 is not fixed to the vehicle main body 102. The lower footboard 50 is smaller in size in the leftward/rightward direction (vehicle width direction) than the upper footboard 10. The lower footboard 50 extends in the forward/rearward direction and has a substantially rectangular solid shape whose lower surface is open. To be specific, the lower footboard 50 includes an upper surface portion 51, a front surface portion 52, a rear surface portion 53, a left surface portion 54, and a right surface portion 55. Six elongated holes 56 each having an oval shape are formed on the upper surface portion 51. The upper surface portion 51 includes wavy folded portions 57 formed at respective edge portions of the elongated holes 56 and projecting upward while changing heights thereof. The elongated holes 56 and the folded portions 57 serve as slip stoppers when an operator goes up and down.

The front suspension member 60 is a member extending downward from a front portion of the upper footboard 10 and holding the lower footboard 50. The front suspension member 60 is formed by stacking a plurality of (in the present embodiment, two) rubber plates and has elasticity as a whole. An upper portion of the front suspension member 60 is fixed to the fixing portion 16 of the upper footboard 10 using fixing members 61. A lower portion of the front suspension member 60 is fixed to the front surface portion 52 of the lower footboard 50 using the fixing members 61. In the present embodiment, bolts and nuts are adopted as the fixing members 61. However, the fixing members 61 are not limited to these. It should be noted that the upper portion of the front suspension member 60 is not fixed to the front surface portion 14 of the upper footboard 10 but is fixed to the fixing portion 16 extending downward from the front surface portion 14. This is because it is difficult to attach the fixing member 61 from an inner peripheral surface side of the front surface portion 14.

The rear suspension member 70 is a member extending downward from the turning mechanism 20 and supporting the lower footboard 50. As with the front suspension member 60, the rear suspension member 70 is formed by stacking a plurality of (in the present embodiment, two) rubber plates and has elasticity as a whole. An upper portion of the rear suspension member 70 is fixed to a lower portion of the flat plate member 33 of the turning mechanism 20 using the fixing members 61. Therefore, the rear suspension member 70 is turnable relative to the upper footboard 10 around an axis extending in the leftward/rightward direction (vehicle width direction). A lower portion of the rear suspension member 70 is fixed to the rear surface portion 53 of the lower footboard 50 using the fixing members 61.

The foregoing has explained the entire configuration of the step 100. As described above, in the step 100 according to the present embodiment, the upper footboard 10 that is the largest in size in the vehicle width direction in the step 100 is not configured to be movable or the like, and as with a typical footboard, the upper footboard 10 does not deform and has a simple structure. Therefore, the size of the upper footboard 10 in the vehicle width direction can be suppressed to a necessary minimum, and thus, the step 100 can be reduced in size in the vehicle width direction.

Behaviors, etc. of Step

Figure 6A:
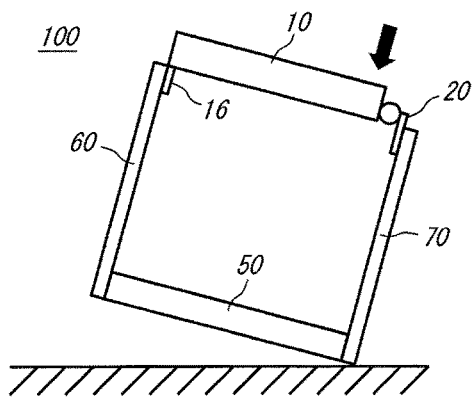
FIG. 6A shows the step according to the embodiment when the step starts contacting a ground surface.
Figure 6B:
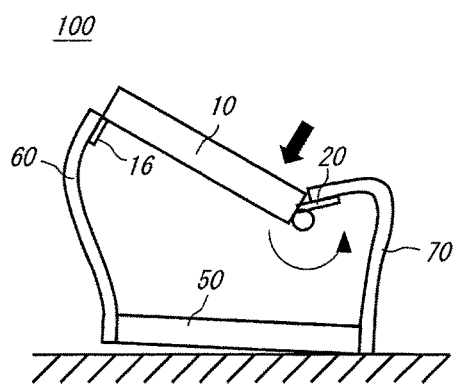
FIG. 6B shows the step according to the embodiment when an upper footboard is pushed toward the ground surface.

Next, behaviors of the step 100 when the step 100 contacts the ground surface will be explained. When the industrial vehicle 101 runs onto the slope as shown in FIG. 1, a rear portion of the lower footboard 50 contacts the ground surface as shown in FIG. 6A. In this state, when the industrial vehicle 101 further runs onto the slope to travel forward, the upper footboard 10 is pushed toward the ground surface as shown in FIG. 6B. However, even when the step 100 becomes such state, the front suspension member 60 and the rear suspension member 70 elastically deform, so that the damage of the step 100 is avoided.

In the present embodiment, the rear suspension member 70 is attached to the upper footboard 10 so as to be turnable. It seems that the same effect can be obtained even if the rear suspension member 70 is fixed to the upper footboard 10 so as to be non-turnable. However, this is not true. As Comparative Example, the following will explain behaviors of a step 200 having the same structure as the step 100 according to the present embodiment except that the rear suspension member 70 is fixed to the upper footboard 10 so as to be non-turnable.

Figure 7A:
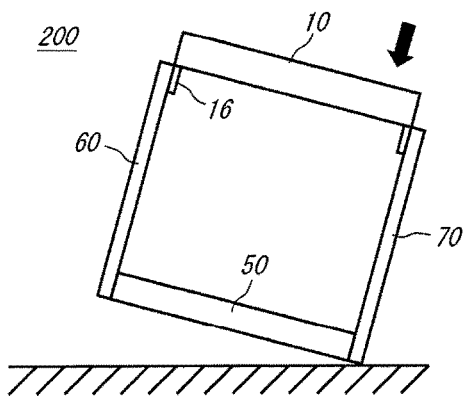
FIG. 7A shows a step according to Comparative Example when the step starts contacting the ground surface.
Figure 7B:
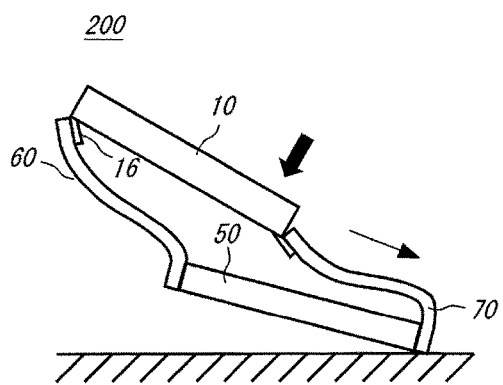
FIG. 7B shows the step according to Comparative Example when the upper footboard is pushed toward the ground surface.

In the case of the step 200 according to Comparative Example, when the rear portion of the lower footboard 50 contacts the ground surface as shown in FIG. 7A, and in this state, the industrial vehicle 101 further runs onto the slope to travel forward, the lower footboard 50 is pushed rearward by the rear suspension member 70 as shown in FIG. 7B. Accordingly, the fixing portion 16 of the upper footboard 10 is pulled rearward through the front suspension member 60. As a result, the fixing portion 16 that is a rigid body causes plastic deformation, and the step 200 is damaged.

On the other hand, in the step 100 according to the present embodiment, the upper portion of the rear suspension member 70 is coupled to a rear portion of the upper footboard 10 so as to be turnable. Therefore, the upper portion of the rear suspension member 70 largely deforms while turning as shown in FIG. 6B, and this releases force applied to the rear suspension member 70. As a result, the fixing portion 16 of the upper footboard 10 is not pulled rearward and therefore does not deform, and the step 100 can be prevented from being damaged.

Further, in the present embodiment, the front suspension member 60 and the upper footboard 10 are fixed to each other so as to be non-tunable, the front suspension member 60 and the lower footboard 50 are fixed to each other so as to be non-tunable, and the rear suspension member 70 and the lower footboard 50 are fixed to each other so as to be non-tunable. Therefore, the lower footboard 50 is prevented from largely swinging relative to the upper footboard 10 in the forward/rearward direction. Thus, an operator can safely go up and down. In addition, since forward turning of the rear suspension member 70 is restricted by the left stopper portion 36 and the right stopper portion 38 (see FIG. 5), the lower footboard 50 can be further stabilized.

REFERENCE SIGNS LIST 10 upper footboard
20 turning mechanism
21 shaft receiving member
22 shaft member
23 turning member
24 protective member
36 left stopper portion
38 right stopper portion
50 lower footboard
60 front suspension member
70 rear suspension member
100 step
101 industrial vehicle
102 vehicle main body

The invention claimed is:

1. A step of an industrial vehicle, the step comprising:
an upper footboard fixed to a side surface of the industrial vehicle;
a turning mechanism provided at a rear end of the upper footboard;
a front suspension member extending downward from a front portion of the upper footboard and having elasticity;
a rear suspension member extending downward from the turning mechanism and having elasticity; and
a lower footboard held by the front suspension member and the rear suspension member, wherein:
an upper portion of the front suspension member is fixed to the front portion of the upper footboard so as to be non-turnable;
a lower portion of the front suspension member is fixed to a front portion of the lower footboard so as to be non-turnable;
a lower portion of the rear suspension member is fixed to a rear portion of the lower footboard so as to be non-turnable; and
an upper portion of the rear suspension member is coupled to a rear portion of the upper footboard through the turning mechanism so as to be turnable around an axis extending in a vehicle width direction.

2. The step according to claim 1, wherein the turning mechanism includes:
a turning member to which the rear suspension member is fixed;
a shaft member supporting the turning member such that the turning member is turnable;
a shaft receiving member fixed to the upper footboard and including at least two receiving portions receiving the shaft member; and
a tubular protective member located between the two receiving portions and covering the shaft member with a predetermined gap in a radial direction.

3. The step according to claim 1, wherein the turning mechanism includes a stopper portion configured to restrict forward turning of the rear suspension member.

4. The step according to claim 2, wherein the turning mechanism includes a stopper portion configured to restrict forward turning of the rear suspension member.

* * * * *